Oct. 14, 1952  H. KARP ET AL  2,614,215
ELECTRONIC GATING CIRCUITS
Filed Feb. 15, 1949
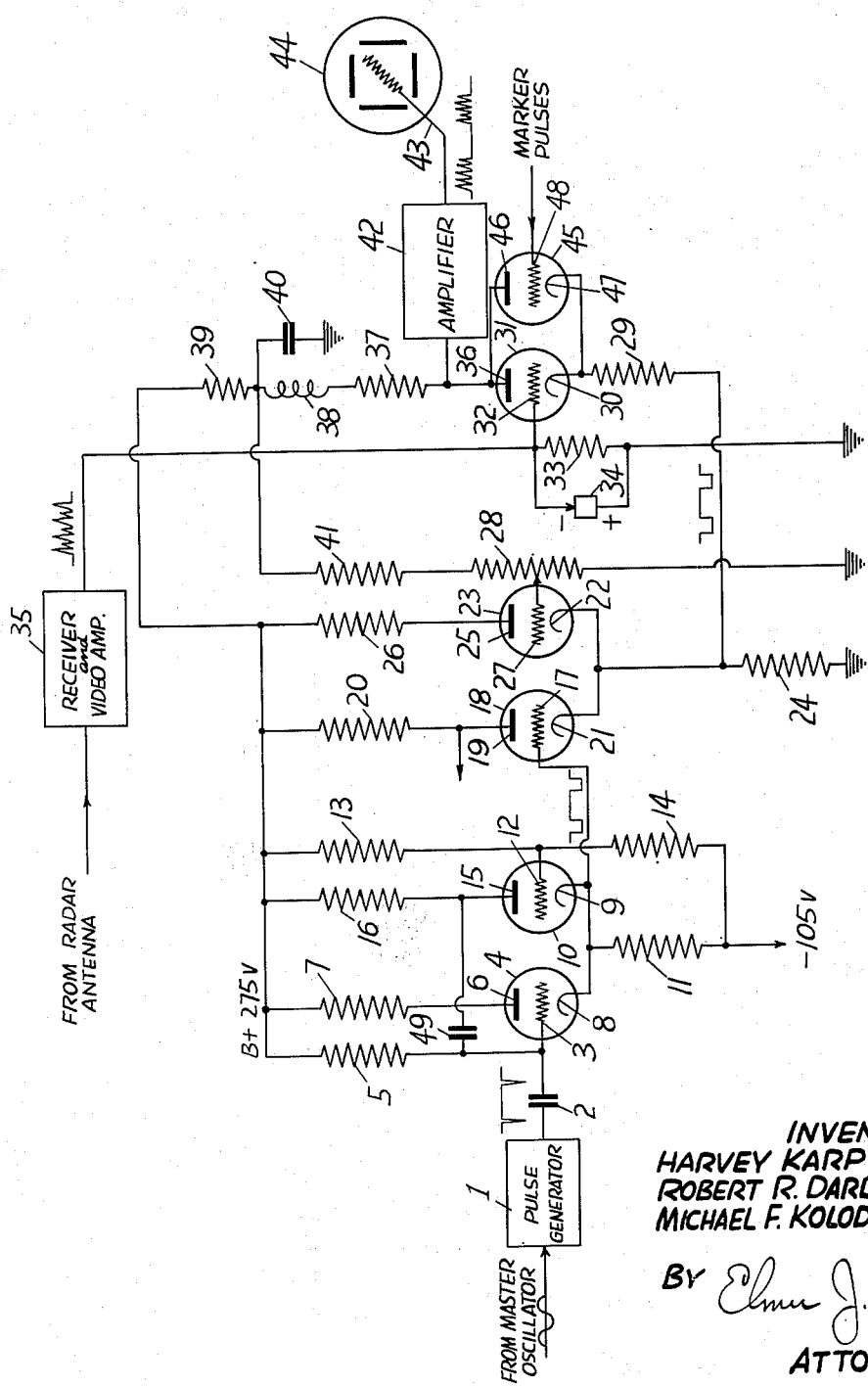
INVENTORS
HARVEY KARP
ROBERT R. DARDEN, JR.
MICHAEL F. KOLODZIEJ
BY Elmer J. Gorn
ATTORNEY Patented Oct. 14, 1952

2,614,215

UNITED STATES PATENT OFFICE 2,614,215

ELECTRONIC GATING CIRCUITS

Harvey Karp, Waltham, Mass., Robert R. Darden, Jr., Solromar, Calif., and Michael F. Kolodziej, Waltham, Mass., assignors to Raytheon Manufacturing Company, Newton, Mass., a corporation of Delaware Application February 15, 1949, Serial No. 76,492

10 Claims. (Cl. 250—27)

This application relates to electron discharge circuits and more particularly to a gating circuit whereby received signals may be passed or rejected periodically.

In radar systems of the pulse-echo type, it is necessary that the electron beam in the cathode ray tube be turned off during the retrace period, so that signals received during the retrace period will not appear on the scope to be confused with signals received during the normal trace period. Furthermore, in some cases it is desirable that the electron beam and the signal amplifier, when turned on, be brought up to precisely the threshold where signals will be passed and presented on the screen. This is desirable in order that all the signals received be presented on the scope. If the threshold level is exceeded by the gating pulse, this pulse will be fed through to the cathode ray screen, thus reducing the signal to background contrast which would normally appear on the screen.

Therefore, it is an object of this invention to provide a gating circuit which will accurately gate the signals applied to the cathode ray tube.

It is a further object of this invention to provide a gating circuit wherein interference from the gating operation does not appear on the screen.

Another object of this invention is to provide a gating circuit wherein the width of the gate is maintained constant regardless of the strength of the received signals thereby eliminating jitter at the end of the trace.

Other and further objects of this invention will be apparent as the description thereof progresses, reference being had to the accompanying drawing wherein:

The single figure represents a schematic diagram of an embodiment of the invention.

Referring now to the drawing there is shown a pulse generator 1 which generates pips of, for example, a few microseconds' duration in response to a sine wave input from a master oscillator with the pips occurring once every cycle of the input sine wave. This may be accomplished by any of several well-known pip generators.

The pips, which are negative, are fed through a condenser 2 to the grid 3 of a tube 4 which is one section of a two-tube multivibrator. The grid 3 is connected to B+ through a grid resistor 5. The plate 6 of tube 4 is connected to B+ through a plate load resistor 7. The cathode 8 of the tube 4 is connected to the cathode 9 of the tube 10 which is the second section of the two-tube multivibrator. The two cathodes 8 and 9 are connected to a source of negative potential through a resistor 11. The grid 12 of the tube 10 is connected to the midpoint of the voltage divider network comprising a resistor 13 which is connected to B+ and resistor 14 which is connected to a source of negative potential. In the particular circuit shown B+ is 275 volts and the negative potential is 105 volts. However, these values may be varied considerably. The plate 15 of tube 10 is connected through a resistor 16 to B+ and also through a condenser 49 to the grid 3 of tube 4. The values of the resistors 13 and 14 are such that in the absence of a pip from the pulse generator the grid 12 is normally below cutoff. The grid 3 which is normally above cut-off, due to its connection to B+ through resistor 5, thus causing the tube 4 to conduct heavily, is driven negative by a pip from the pulse generator 1. This causes a decrease in current through the cathode resistor 11 which is common to both tubes 4 and 10. This lowers the potential of cathode 9 until the tube 10 is no longer cut off. Current flows through tube 10 and the plate resistor 16 causing the plate 15 of tube 10 to be driven negative. This negative potential is coupled through the condenser 49 to the grid 3 of tube 4 causing the tube 4 to go into cutoff. The tube 4 remains cut off until the condenser 49 charges sufficiently through the resistor 5 and the parallel combination of resistor 16 and resistor 11 to allow the tube 4 to conduct, whereupon current through the cathode resistor 11 begins increasing the bias of tube 10 thereby decreasing the current flow in tube 10 through resistor 16. The plate 15 of tube 10 is thus driven positive driving the grid 3 of tube 4 positive until the tube 10 is once more cut off and the tube 4 conducting heavily in its original condition.

This produces a negative pulse across the cathode resistor 11 the duration of which is governed mainly by the values of the condenser 49 and the resistor 5. This negative pulse is fed to the grid 17 of a tube 18 by connecting grid 17 directly to the cathodes 8 and 9 of the multivibrator. Plate 19 of the tube 18 is connected through a resistor 20 to B+. This resistor 20 may be eliminated; however, it is shown here as a means of producing positive pulses which may be used to trigger other circuits in the equipment. The cathode 21 of tube 18 is connected to another cathode 22 of a tube 23 and to ground through a cathode load resistor 24. The plate 25 of tube 23 is connected through a resistor 26 to B+. The grid 27 of the tube 23 is connected to the variable tap of a potentiometer 28, one side of which is connected to ground. The other side of potentiometer is connected to B+ through a resistor 41 and a decoupling resistor 39, the junction of 39 and 41 being grounded for pulses by a condenser 40. The negative pulses fed to the grid 17 of the tube 18 will appear across the cathode load resistor 24 due to the cathode follower action of the tube 18. This negative pulse is fed through a resistor 29 to the cathode 30 of gating tube 31. The grid 32 is connected to ground through a grid resistor 33 which is bypassed by a germanium rectifier 34 connected thereacross which functions as a D. C. restorer. The grid 32 is fed from a receiver and video amplifier 35 of the radar system. The plate 36 of the gating tube 31 is connected to B+ through a resistor 37, an inductance 38 and decoupling resistor 39. The plate 36 of the gating tube is connected to an amplifier 42 which feeds the grid 43 of the cathode ray tube 44. The cathode ray tube 44 as shown here is a P. P. I. tube in a radar set having the standard sweep circuits and wherein targets are presented on the screen by intensity modulation through the grid 43. By adjusting the tap of potentiometer 28, the current through tube 23 may be varied, thus varying the quiescent potential across cathode load resistor 24. This potential across resistor 24 is adjusted so that when a negative pulse is applied to the grid 17 of tube 18 the gating tube 31 will be precisely at its cutoff point, and in the absence of a pulse on grid 17 the gating tube 31 will be well below cutoff.

Therefore, when a pulse is applied to grid 17 and the tube 31 is exactly at cutoff, positive signals fed to the grid 31 will be passed by the tube 31 amplified by the amplifier 42 and presented as positive pulses. The inductance 38, which is a high impedance to high frequencies, causes the gain of the tube 31 to be larger at high frequencies, thus increasing the band width and frequency response of the gate 31. Also, the resistor 29 causes considerable degeneration to the amplification of tube 31, thereby improving the linearity of amplification of tube 31.

It may be noted that small positive signal pulses appearing on the grid 32 of the gating tube 31 will be amplified very little since they will cause operation of the gating tube on the nonlinear, low gain portion of the tube's characteristic curve. However, these small signals will be operating on a high gain portion of the characteristic curves of both the video amplifier 35 preceding the gating tube 31 and the amplifier 42 fed by tube 31, while excessively large signals will be limited by the video amplifier 35 and amplifier 42. Therefore, the overall effect will be an emphasis of low amplitude signals for presentation on the screen of tube 44.

It may be noted that, by reason of the manner in which the gating pulse is applied to gating tube 31, no signals from the gating pulse operation appear on the screen, whereas, if the gating pulse were applied by some other means as, for example, a condenser or transformer, objectionable pips at the beginning and ending of each gating pulse would be fed through to the grid 43 of the cathode ray tube. Furthermore, since the tube 18 is a cathode follower, it effectively isolates the multivibrator tubes 4 and 10 from loading by the gating circuit whereby the variations in the load due to received signals cannot feed back to the multivibrator to change its gating time. This eliminates jitter at the end of the trace.

The germanium rectifier 34 shown here eliminates undesirable negative bias shifting which may be applied to the grid 32 of the gating tube, thus retaining the grid in a position to properly respond to all positive pulses received from the receiver and video amplifier 35.

A tube 45 having its plate 46 and cathode 47 in parallel with the plate 36 and cathode 30, respectively, of tube 31, and its grid 47, connected to a source of pulses, may be used to inject additional signal information in the form of range markers and video signals.

This completes the description of the illustrated embodiments of this invention. However, many modifications will be apparent to persons skilled in the art. For example, the standard A scope presentation could be used instead of the P. P. I. presentation and many different types of gate generators well known in the art could be substituted for that shown. Accordingly, applicant does not wish to be limited to the specific details of the invention described herein except as defined in the appended claims.

What is claimed is:

1. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conduction of said gating tube from affecting said pulse source, and a phase-inverting amplifier connected to said gating tube whereby small signals which are amplified a small amount relative to large signals by said gating tube will be amplified a large amount relative to large signals by said amplifier.

2. An electrical circuit comprising a gating tube having a source of electrons, a control electrode, an anode, a signal input channel connected to said control electrode, a source of rectangular pulses, means fed by said source and connected to said gating tube for applying said pulses to said gating tube to periodically render said tube nonconductive to signals from said channel, means connected to said gating tube for adjusting the bias of said gating tube, and a phase-inverting amplifier connected to said gating tube whereby small signals which are amplified a small amount relative to large signals by said gating tube will be amplified a large amount relative to large signals by said amplifier.

3. An electrical circuit comprising a signal input channel, a gating tube fed by said channel, a source of rectangular pulses, means fed by said source and connected to said gating tube for applying said pulses to said gating tube to periodically render said tube nonconductive to signals from said channel, means connected to said gating tube for adjusting the bias of said gating tube comprising a second tube having a cathode circuit comprising an impedance in the cathode circuit of said gating tube, and means connected to said second tube for adjusting the current flow through said second tube.

4. An electrical circuit comprising a signal input channel, a gating tube fed by said channel, a source of rectangular pulses, and means fed by said source and connected to said gating tube for applying said pulses to said gating tube to periodically render said tube nonconductive to signals from said channel comprising a cathode follower whose cathode is connected to the cathode of said gating tube through an impedance.

5. An electrical circuit comprising a signal input channel, a gating tube fed by said channel, a source of rectangular pulses, and means fed by said source and connected to said gating tube for applying said pulses to said gating tube to periodically render said tube nonconductive to signals from said channel comprising a cathode follower connected to the cathode circuit of said gating tube through a resistance.

6. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conduction of said gating tube from affecting said pulse source comprising a cathode follower, and a phase-inverting amplifier connected to said gating tube whereby small signals which are amplified a small amount relative to large signals by said gating tube will be amplified a large amount relative to large signals by said amplifier.

7. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conduction of said gating tube from affecting said pulse source comprising a cathode follower connected to the cathode circuit of said gating tube, and a phase-inverting amplifier connected to said gating tube whereby small signals which are amplified a small amount relative to large signals by said gating tube will be amplified a large amount relative to large signals by said amplifier.

8. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conduction of said gating tube from affecting said pulse source, means connected to said gating tube for adjusting the bias of said gating tube, and a phase-inverting amplifier connected to said gating tube whereby small signals which are amplified a small amount relative to large signals by said gating tube will be amplified a large amount relative to large signals by said amplifier.

9. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conjunction of said gating tube from affecting said pulse source comprising a cathode follower, and means connected to said tube for adjusting the mean bias of said gating tube comprising a second tube having a cathode circuit comprising an impedance in the cathode circuit of said gating tube.

10. An electrical circuit comprising a signal input channel, a gating tube fed by said channel, a source of rectangular pulses, means fed by said source and connected to said gating tube for applying said pulses to said gating tube to periodically render said tube nonconductive to signals from said channel and for preventing changes in conduction of said gating tube from affecting said pulse source comprising a cathode follower connected to the cathode circuit of said gating tube, means connected to said gating tube for adjusting the bias of said gating tube comprising a second tube having a cathode circuit comprising an impedance in the cathode circuit of said gating tube, and means for adjusting the current flow through said second tube.

HARVEY KARP.
ROBERT R. DARDEN, Jr.
MICHAEL F. KOLODZIEJ.

REFERENCES CITED

The following references are of record in the file of this patent:

UNITED STATES PATENTS

| Number | Name | Date |
|---|---|---|
| 2,092,496 | Branson | Sept. 7, 1937 |
| 2,300,999 | Williams | Nov. 3, 1942 |
| 2,338,395 | Bartelink | Jan. 4, 1944 |
| 2,405,231 | Newhouse | Aug. 6 1946 |
| 2,438,717 | Puckette | Mar. 30, 1948 |
| 2,460,061 | Chapin | Jan. 25, 1949 |
| 2,482,544 | Jacobsen | Sept. 20, 1949 |